US005797050A

United States Patent [19]
Smith

[11] Patent Number: 5,797,050
[45] Date of Patent: Aug. 18, 1998

[54] SELECTIVE GLARE REDUCTION OCULAR FOR SCENERY WITH VERY BRIGHT OBJECTS

[76] Inventor: James Lynn Smith, 1933 Evistal St., Ft. Walton Beach, Fla. 32547

[21] Appl. No.: 801,622

[22] Filed: Feb. 18, 1997

[51] Int. Cl.[6] .............................. G03B 7/08; G01J 1/32; G02F 1/01; G02F 1/35
[52] U.S. Cl. .................... 396/241; 396/262; 250/205; 349/2; 349/25; 349/104; 349/113; 359/241; 359/601
[58] Field of Search ................... 596/457, 241, 596/213, 234, 233, 373, 544; 250/205; 349/14, 13, 2, 1, 116, 25–30, 113, 104, 114, 115; 359/241, 601, 94; 396/262, 506

[56] References Cited

U.S. PATENT DOCUMENTS

| | | | |
|---|---|---|---|
| 3,434,779 | 3/1969 | Damen | 350/160 |
| 3,459,889 | 8/1969 | Michels et al. | 359/241 X |
| 3,620,597 | 11/1971 | Schwartz | 350/160 |
| 3,722,998 | 3/1973 | Morse | 349/2 X |
| 3,724,349 | 4/1973 | Von Belvard et al. | 396/233 |
| 4,652,916 | 3/1987 | Suzaki et al. | 349/1 X |
| 4,724,311 | 2/1988 | Mechlenberg | 250/205 X |
| 4,786,125 | 11/1988 | Magarinos | 350/3.65 |
| 4,815,828 | 3/1989 | Rushford | 350/351 |
| 5,062,693 | 11/1991 | Beratan | 359/241 |
| 5,130,530 | 7/1992 | Liu | 250/216 |
| 5,172,278 | 12/1992 | Tutt | 359/885 |
| 5,280,169 | 1/1994 | Honey | 250/216 |
| 5,300,465 | 4/1994 | Grateau | 501/13 |
| 5,348,688 | 9/1994 | Sharp | 252/582 |
| 5,384,650 | 1/1995 | Tekolste | 359/77 |
| 5,391,329 | 2/1995 | Dougherty | 359/241 X |
| 5,531,940 | 7/1996 | Gupta | 264/1.7 |
| 5,541,705 | 7/1996 | Kan et al. | 396/233 |

OTHER PUBLICATIONS

Haas, W.G. "Liquid Crystal Display Research: The First Fifteen Years" Molecular Crystals and Liquid Crystals vol. 94 pp. 1–31 (1983).

J. Lynn Smith, et al "Real–Time Optical Processing Using the Liquid Crystal Light Valve" J. of Appl. Photographic Eng. vol. 5 pp. 236–243 (1979).

Soref, R.A. and M.J. Rafuse, "Electrically Controlled Birefringence of Thin Nematic Films", *Journal of Applied Physics*, vol. 43(5), pp. 2029–2037 (1972).

Beard, T.D., W.P. Bleha and S.–Y. Wong, "AC Liquid–Crystal Light Valve", *Appl. Phys. Lett.* 22, (1973), pp. 90–94.

Hanson, E.G., Y.R. Shen and G.K.L. Wong, "Experimental Study of Self–Focusing in a Liquid Crystalline Medium", *Applied Physics* vol. 14, pp. 65–77 (1977).

Crooker, P.P., H.–S. Kitzerow and F. Xu, "Polymer Dispersed Cholestric Liquid Crystals", *SPIE* 2175, (1994), pp. 173–182.

Karioja, P., A. Karppinen, H1 Kopola and R. Myllkyla, "Optical Attenuator Using Liquid Crystal Film", *SPIE* 2175, (1994), pp. 183–190.

Uchida, T., "Application and Device Modeling of a Liquid Crystal Display", *Molecular Crystals and Liquid Crystals*, vol. 123, pp/ 15–55 (1985).

(List continued on next page.)

*Primary Examiner*—W. B. Perkey

[57] ABSTRACT

A real-time, optical, nonlinear attenuator device situated in the image plane of an ocular of special construction provides a highly sensitive, broad spectral band, selective, glare reduction ocular. This system is suitable for the eye or camera which is directed at scenery with illumination ranging from that of a room interior to outside daylight. Special adaptations from spatial light modulator technology and modifications of optical power limiter art increase the nonlinear attenuator device sensitivity to bright light by orders of magnitude over that in current systems using known passive, optical, nonlinear materials. The ocular concept includes an input lens which gathers more light rays than can pass to the eye in order to further enhance nonlinear sensitivity, contains places for filters, operates with either an absorption-promoting or scattering nonlinear device in the intermediate image plane, corrects image inversion and provides embodiments for transmissive or reflective operation.

12 Claims, 4 Drawing Sheets

OTHER PUBLICATIONS

Yoshino, K., "Transient Light Scatteriang by Domain Switching in Ferroelectric Liqiud Crystal and its Application as Fast Opto–Electronics Device", *Ferroelectrics*, vol. 59, pp. 145–160 (1984).

Heilmeier, G.H., L.A. Zanoni and L.A. Barton, "Dynamic Scattering: A New Electrooptic Effect in Certain Classes of Nematic Liquid Crystals", *Proceedings if the IEEE*, vol. 56(7), pp. 1163–1171 (1968).

Mitchell: "Photoactive polymers" *Internet web pages* identifying Mitchell's group at the University of Reading in the U.K., showing one of the ongoing activities in photoactive/conducting liquid crystal polymers.

Yo: "Shimitzu Yo" *Internet web page* identifying photoconductive liquid crystal work by Yo as an activity at the Government Industrial Research Institute in Osako, Japan.

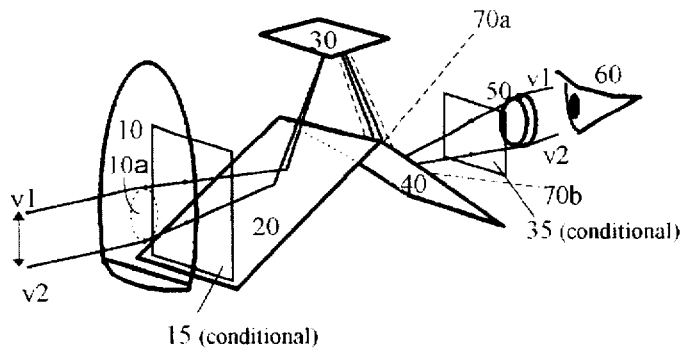
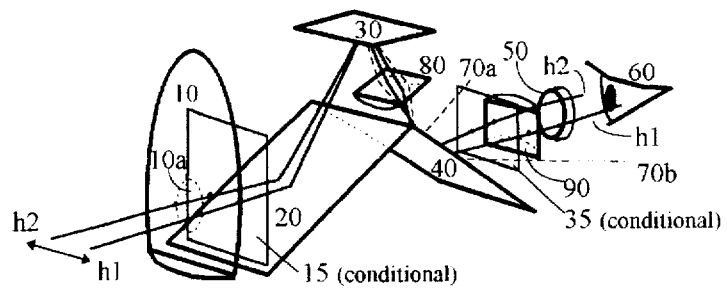
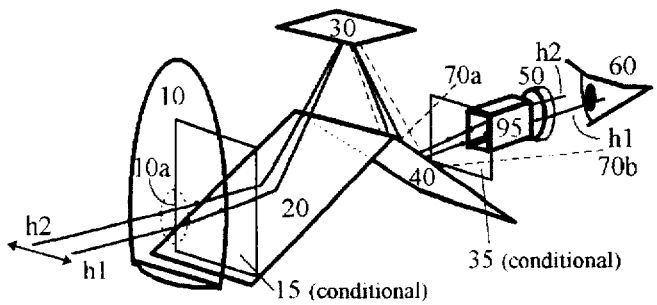
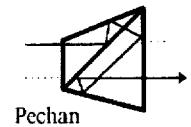

Fig. 1. Reflective arrangement for selective glare reduction ocular with nonlinear device in the intermediate image plane: a. Simplest version shows virtual image upright, but with lateral inversion (right/left reversal), b. including cylindrical lenses to correct lateral inversion, c. including inverting prism to correct lateral inversion, d. side view of one option for element 95, and e. side view of another option for element 95. Unused lower portion of depicted lens 10 is removed.

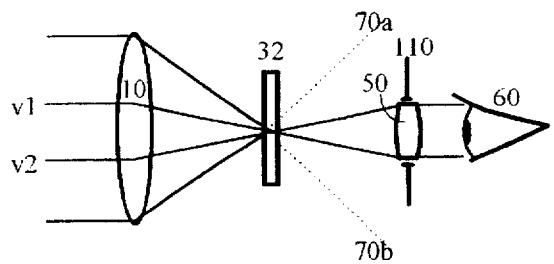

Fig. 2a

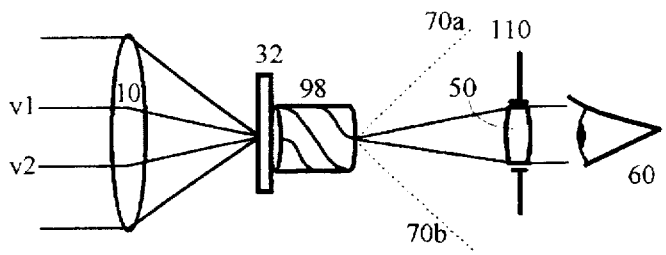

Fig. 2b

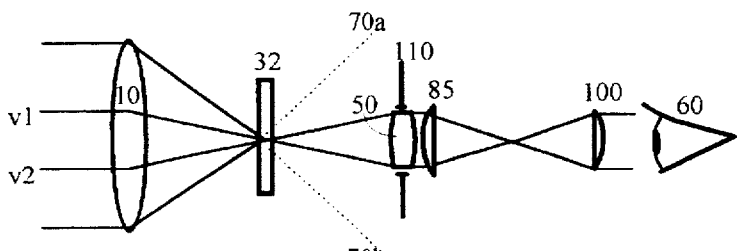

Fig. 2c

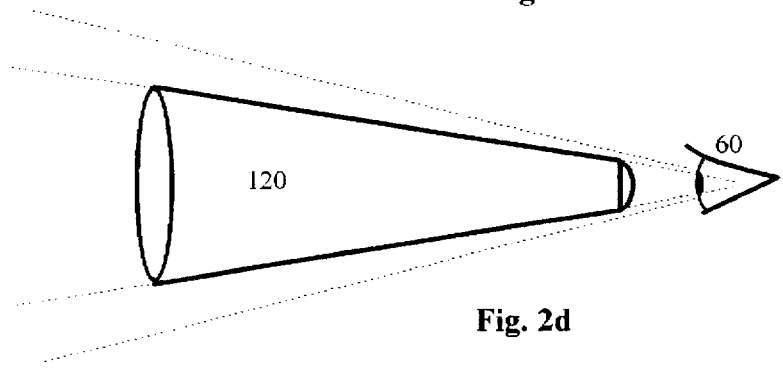

Fig. 2d

Fig. 2. Transmissive arrangement for selective glare reduction ocular with nonlinear device 32 (includes filters, if any) in the intermediate image plane: a. Simplest version has inverted image, b. fiber optic image rotator corrects inversion, c. lens pair with added intermediate image plane corrects inversion, d. components shaped and enclosed for minimum obscuration outside ocular's field of view.

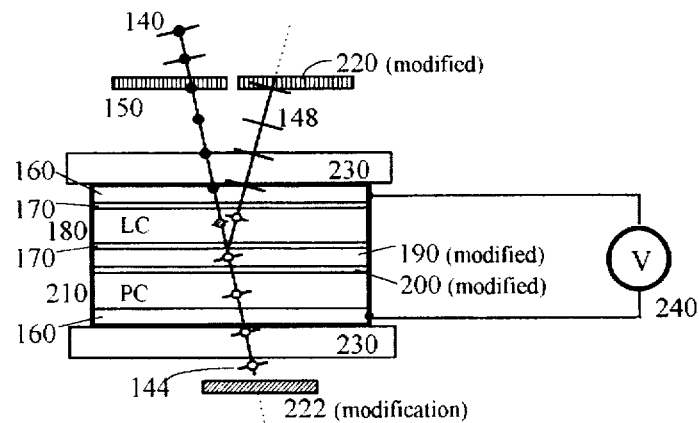
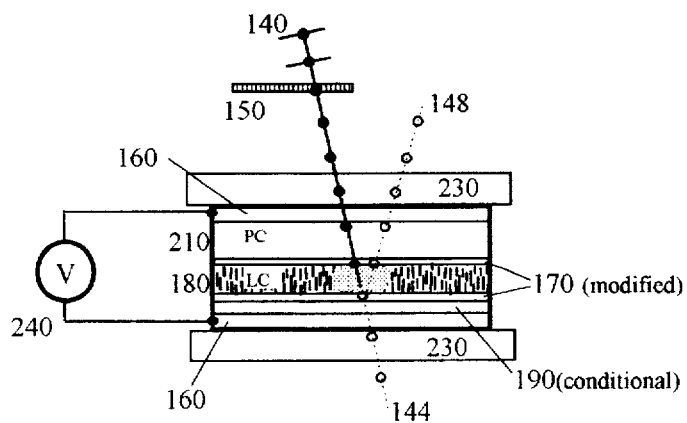
Fig. 3. Active, nonlinear, optical reflectance/transmittance attenuator devices based on liquid crystal light valve technology: a. Optically addressed, hybrid field-effect, twisted nematic liquid crystal light valve with parametric modifications, b. guest-host liquid crystal dye absorption medium with negative $\Delta\varepsilon$ in light valve.

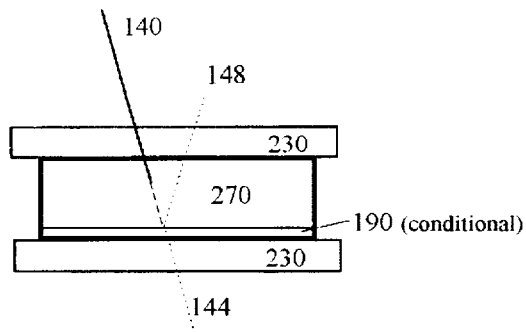
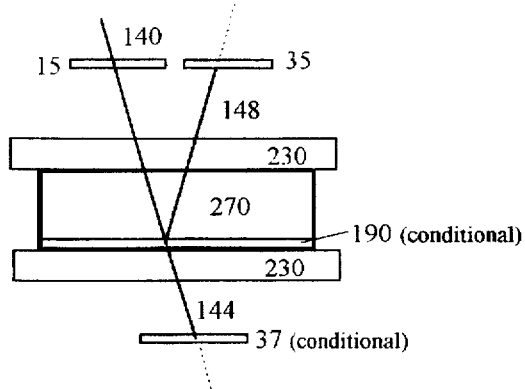
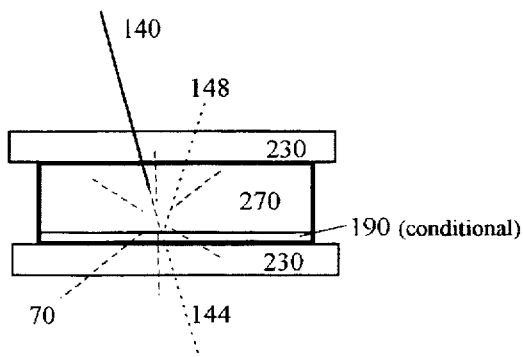
Fig. 4. Passive nonlinear optical attenuator, a. type which attenuates within active material, b. type which modifies light so that filters will attenuate intensity, c. type which attenuates by scattering light.

1

SELECTIVE GLARE REDUCTION OCULAR FOR SCENERY WITH VERY BRIGHT OBJECTS

BACKGROUND

1. Field of the Invention

This application describes a new type of ocular containing an optically nonlinear device which selectively attenuates very bright portions of observed imagery in a real-time manner. It allows the viewing or recording of scenery near the sun or other bright objects where glaring contrast with the surroundings normally obscures certain objects of interest.

BACKGROUND

2. Description of Prior Art

The problem of protecting eyesight and improving detailed perception of objects in the presence of bright sunlight has heretofore been answered by sun visors and dark sun glasses. More recently photochromic sunglasses which darken slowly according to the brightness of sunlight has added some further relief (e.g., U.S. Pat. Nos. 5,300,465; 5,531,940). However, the ideal solution is not to darken all observed scenery equally, but to selectively attenuate the brightest objects more, so that the scene has less dynamic range and can be observed comfortably. Applied to photography, this would lessen the saturation and fogging of imagery near that for the brightest objects.

The new answer afforded by this invention is a combination of conventional optical components and a nonlinear optical device based on spatial light modulator technology and optical power limiters. The conventional optics captures light from a scene, converts it to an intermediate image and then reforms it in a manner suitable for direct observation by the eye or instrumentation substituting for the eye. The eye sees a virtal image of the scenery. Although these optics form a unit which does more than an ocular (or eyepiece) used in a telescope or microscope, the term "ocular" will be used because this unit is relatively simple and is used against the eye or instrumentation which acts as an eye. This slightly enlarged concept of ocular is based on optics which is widely understood. Nonlinear optical devices, however, are less well known except among professionals who work with them. In the subject invention, one of these devices is placed in the image plane within the ocular and is responsible for selective attenuation of the brightest imagery.

The nonlinear device may be a passive entity in which some optical property changes when exposed to bright light or it may be an "active" device which is electrically assisted in its response to bright light by an electrical field. Either type is nonlinear in the sense that reflected or transmit ted light is not proportional to the incident light. Rather, reflectance or transmittance decreases in response to high light intensity. Sufficiently intense light exposure may induce or modily the device material's optical scattering, birefringence, optical activity, color center population, surface deformation, photorefraction, two-photon absorption rate or phase state. It may also exhibit nonlnearity through second harmonic generation; at higher energies, much of the input radiation is converted to radiation with twice the optical frequency of the input. Each of these effects, alone or in combination with other optic materials, can cause a decrease of intensity in output optical power. Most of these effects alone are marginally suitable or unsuitable for a real-time, broad-band, nonlinear attenuator at ordinary light intensities. A passive, nonlinear optical device used for protecting sensitive detectors from excessive laser light requires extremely high intensities and is called an optical power limiter (OPL). (See U.S. Pat. Nos. 3,434,779; 3,620, 597; 4,815,828; 4,786,125; 5,172,278; 5,130,530; 5,280, 169; 5,348,688). The OPL device can operate via the two-photon absorption process, ionization-induced absorption, thermal defocus, induced particle scattering, second harmonic generation, or modification of interference notch filters. Required optical power or energy levels for operation of the OPL (see Tutt, U.S. Pat. No. 5,172,278 and separate papers by Hanson, Durbin, Khoo) is from about 0.2 J/cm$^2$ to orders of magnitude higher and are excessive for most purposes of the subject invention which needs to operate at about 0.05 mJ/cm$^2$ or below. Photorefractive and phase-change materials generally will not return quickly to their initial condition following removal of the incident light so an optical or thermal erasure mechanism is required; these materials are better used for optical data processing, storing and holography. Photo-induced color center alteration is a process occurring in the aforementioned photochromic sun glasses or proposed modulators (U.S. Pat. Nos. 5,062,693; 5,300,465) and has too little contrast or else is quite slow, on the order of minutes. The properties of light scattering, birefringence and optical activity, however, are often utilized in certain spatial light modulators (light valves) and are especially relevant to the subject invention, albeit not without modification. In practice, liquid crystal, photoconducting, and often polymer materials are used together in the light valve, and the nonlinear response is enhanced to a practical level by the application of an electrical field (subject reviewed by Haas at Xerox). The details of how these materials are combined to make an optically addressed spatial light modulator (OASLM) vary somewhat. However, each OASLM is at least a sandwich-like structure with transparent electrodes on two outermost substrates, and in between there is a homogenous or layered combination of photoconducting material and a liquid crystal material. Often there are layers of polymer films on either side of the liquid crystals which are treated with ionic bombardment or brushing to obtain a micro structure giving preferential alignment to liquid crystals at its two boundaries. A photoconducting layer may be a combination of two sub-layers, a photoactive layer in contact with a charge transport layer. Other layers which may be involved in an OASLM are an inner reflective/light blocking layer which separate read-in and read-out light, and external polarizers (see papers by Haas at Xerox and Beard at Hughes Research; also Smith at the U.S. Army MICOM and U.S. Pat. No. 5,384,650). These two additional layer types are most often used with twisted nematic liquid crystals which change birefringence or optical activity as light induces photocurrent and consequent electric field change. The manner in which incident light changes the electric field by causing photoconductivity is as follows: The electric field (alternating ac or direct current dc) is imposed by applying a voltage to the transparent electrodes. For a device with a photoconductor layer, the applied voltage is divided between the photoconductor and the liquid crystal material. Upon photoexcitation, charge movement within the photoconductor shields the bulk of the photoconductor from the field, and this induces a greater electric field value across the liquid crystal layer. The changed field always alters the alignment of the liquid crystals, affecting polarization and hence intensity with birefringent or optically active devices using polarizers. OASLMs have found applications in the fields of optical data processing and intensified image projection. Modest intensity read-in light patterns address the photoconducting medium and thus modulate read-out light in both cases. Read-out light, which must be prevented from causing photoconductivity, is often a laser beam in data processing applications and a very bright white light for projectors. Color projectors may have three OASLM channels with input and output filters on each one.

To summarize, sun glasses and conventional oculars mentioned above are alone not capable of selectively attenuating especially bright objects in a scene. Photochromic materials are very slow or exhibit low contrast in their operation and, used in glasses, attenuate all parts of a scene uniformly even though only one part may be the extremely bright. Optical power limiters based on passive, nonlinear materials suitable for protecting instruments from extremely bright flashes or laser beams have thresholds many orders of magnitude higher than those of concern to most purposes of the subject invention. Special applications exist for even these in the subject invention, however. Important features of the most useful nonlinear devices (the OASLMs based on spatial light modulator technology discussed above) is that their designs are optimized for the application of addressing with light of one kind (e.g., white light) and reading out with light of another kind (e.g., monochromatic laser light or a much brighter, more directional white light). Therefore it is important to shield the photoconductor material from the read-out light. Also, for imaging, the design is optimized for operation in the linear region of the input-to-output curve. The disadvantage of these optimizations is that the device cannot be used as a nonlinear attenuator without modification. A nonlinear attenuator would require that read-in light and read-out light be of the same source and that the photoconductor material not be shielded from light in any way.

Objects and Advantages

The object or purpose of the subject invention is to combine an ocular having both special construction and an intermediate image plane with a real-time, broad-band, nonlinear device modified for attenuation of bright parts of imagery intended for human observation, thereby obtaining a selective glare reduction ocular useful for the eye or a camera. The component modifications are unusual, and the combination of the ocular with a nonlinear device for this purpose makes a new application which is both unique and fills a definite need.

Advantages of the selective glare reduction ocular over sunglasses or goggles is that it does not attenuate the whole scene uniformly; only light from brightest parts receives severe attenuation. Its advantage over an obvious ocular design with a photochromic material in the intermediate image plane is that, generally, it is far more sensitive and operates real-time; that is, it responds to the presence of bright light and, upon light removal, reverses its response in a time comparable to the human eye response time. An advantage of the subject invention over the present day optical power limiter (OPL) which uses a passive, nonlinear optical material is that it specifically addresses the real-time, continual observation of broad specular band scenery ordinarily encountered by the human eye, rather than protection from brilliant lasers or unusual flashes of light. To this end the subject invention offers ocular and nonlinear device modifications which increase optical power sensitivity by orders of magnitude and also addresses issues of image orientation, continuity and specular band. Some advantageous features of the ocular itself include its design for the most efficient collection of light, its use for different kinds of nonlinear materials, and its ability to correct virtual imagery orientation. Advantageous modifications of the nonlinear devices which are a part of the subject invention are as follows: Firstly, modifications of the passive, nonlinear material by adding a reflective layer and inclusion in a special ocular embodiment with high collection efficiency and internal design for reflective ration enhances sensitivity so that selected applications (other than OPL protection) for the eye or a camera are possible. Secondly, specific modifications or combinations of spatial light modulators and photo conductor materials provides advantages in their becoming real-time, active, nonlinear attenuator devices which are orders of magnitude greater in broad-band sensitivity than the passive, nonlinear devices.

DRAWING FIGURES

FIG. 1 caption and FIG. 1a-1c shows versions of the glare reduction ocular containing a nonlinear optical attenuator used in the reflective option.

FIG. 2 caption and FIGS. 2a-2d illustrates versions and aspects of the glare reduction ocular containing a nonlinear optical attenuator used in the transmissive option.

FIG. 3 caption and FIGS. 3a-3b depicts two options for the active, nonlinear, optical reflectance/transmittance attenuator device based on liquid crystal and photoconductor technology.

FIG. 4 caption and FIG. 4a-4c illustrates versions of the passive, nonlinear, optical attenuator device.

REFERENCE NUMERALS IN DRAWINGS

| | |
|---|---|
| v1 | top ray initially in a vertical plane passing through lens 10 and reaching eye |
| v2 | bottom ray initially in a vertical plane passing through lens 10 and reaching eye |
| 10 | input lens of ocular |
| 10a | region of lens 10 wherein parallel rays reach eye |
| 15 | input filter |
| 20 | 1st folding mirror |
| 30 | nonlinear optical attenuator, reflective (except filters) |
| 32 | nonlinear optical attenuator, transmissive (including any filters) |
| 35 | output filter |
| 37 | another output filter |
| 40 | 2nd folding mirror |
| 50 | collimating lens |
| 60 | eye or camera |
| 70 | scattered light |
| h1 | right ray initially in a horizontal plane passing through lens 10 and reaching eye |
| h2 | left ray initially in a horizontal plane passing through lens 10 and reaching eye |
| 70a | scattered ray impacting on top of ocular stop or wall |
| 70b | scattered ray impacting on bottom of ocular stop or wall |
| 80 | 1st cylindrical lens in a lateral inversion pair |
| 85 | lens, focuses on fiber optic device |
| 90 | 2nd cylindrical lens in a lateral inversion pair |
| 95 | prism assembly for lateral inversion |
| 98 | coherent fiber optic image rotator bundle |
| 100 | lens, collimates image points on fiber optic bundle output for eye |
| 110 | stop or aperture for collimator lens 50 |
| 120 | conical shape ocular enclosure |
| 140 | light incident on nonlinear attenuator device |
| 144 | light transmitted through active region of nonlinear attenuator device, incident on output filter, if any |

-continued

| 148 | light reflected from active region of nonlinear attenuator device, incident on output filter, if any |
|---|---|
| 150 | input filter, polarizer |
| 160 | electrode, transparent on top, and also bottom for transmissive devices |
| 170 | thin, usually insulating, transparent alignment layer |
| 180 | liquid crystal layer |
| 190 | mirror |
| 200 | light blocking layer |
| 210 | photoconductive layer |
| 220 | output filter for nonlinear reflective device, polarizing |
| 222 | output filter for nonlinear transmissive device, polarizing |
| 230 | supportive substrate, top always transparent, bottom usually transparent |
| 240 | power or voltage source for electric field |
| 270 | passive, nonlinear attenuator material layer or layers |

DESCRIPTION—FIGS. 1 through 4

FIGS. 1-2 illustrate the concept of the glare reduction ocular in terms of optical arrangement. Specific drawings are depicted with some parametric variables marked as "conditional", meaning that the value or existence of that component depends on some feature of the nonlinear modulator used. Some figures lead into others, and all are possible embodiments of the ocular. However, that shown as FIG. 1b will be considered the "preferred embodiment". The reflective arrangement of FIG. 1 and the transmissive arrangement of FIG. 2 are both needed to teach the construction of an ocular, because nonlinear attenuators may work in either reflective or transmissive mode. However, the concept entailed in all drawings of FIGS. 1 and 2 is that of an "ocular" which contains an optically nonlinear attenuator.

FIG. 1 represents an ocular embodiment with internal optics arranged to exploit the reflective version of a nonlinear optical attenuator device. FIG. 1a is a the basic arrangement representing the ocular for the nonlinear device. It is designed with larger input lens 10 than output lens 50, which, at low intensity, receives light only from region 10a of the input lens. Rays for tracking v1 and v2 are in a vertical plane, mirrors 20 and 40 are reflective on the upper side, and filter locations 15 and 35 contain the type filters required by device 30. Perforated lines 70a, 70b represented any scattered light from the nonlinear device component at 30. The eye 60 may represent a camera aperture.

FIG. 1b is the preferred embodiment of the ocular and is the same basic arrangement as that in FIG. 1a, except that it has additional, correcting elements and different light rays for tracking. Rays h1 and h2 enter the device in a horizontal plane. Cylindrical lenses 80 and 90 are positioned as shown to correct lateral inversion (right-left reversal) in the image.

FIG. 1c is an embodiment like that in FIG. 1a, except that it also has an additional optic to correct lateral inversion. Like FIG. 1b, it has rays h1 and h2 which enter in a horizontal plane. Unlike the cylindrical lenses of 1b, however, 1c depicts the use of a prism device 95 to attain lateral inversion. FIGS. 1d-1e illustrate Pechan and dove prisms as options for 95. They are illustrated as inverting light in the plane of the paper. To use in the ocular for lateral inversion, a 90 degree rotation of the shown device about a right-left axis in the plane of the page is required.

FIG. 2 represents an ocular embodiment with internal optics arranged for use with a transmitting, nonlinear optical attenuator. As in FIG. 1, the most basic design is introduced first: FIG. 2a illustrates a large input lens 10 and small output lens 50. Rays v1 and v2 are in the vertical plane. Stop 110 surrounds and apertures the small lens 50. The transmitting nonlinear attenuator device 32 contains any necessary filters for its operation in its layering. Perforated lines 70a, 70b represent any light scattered from the nonlinear attenuator.

FIG. 2b depicts the basic design of 2a with the addition of an image inverting, coherent fiber optic bundle 98. Image inversion means inversion through the origin (rotation 180 degrees). FIG. 2c depicts 2a again with a different method of image inversion than that in 2b. Two lenses 85 and 100 are used for inversion. FIG. 2c illustrates the general shape for the transmission ocular enclosure 120. The eye 60 has a field-of-view with minimum obscuration outside the ocular's field-of-view.

FIG. 3 depicts versions of the real-time, nonlinear, optical attenuator device which entails slight modifications of existing and potential optically addressed, spatial light modulators based on liquid crystal light valve and photoconducting fim technology. These modifications are adaptations for an active, real-time, nonlinear attenuator device.

FIG. 3a illustrates a preferred embodiment which shows a hybrid field effect, optically addressed, twisted nematic liquid crystal light valve (see articles by Beard, Smith and TeKolste's U.S. Pat. No. 5,384,650) which is modified here to act as an active nonlinear optical attenuator. Layers of the device are enclosed and supported by substrate material 230. Liquid crystals in a nematic layer 180 with much greater dielectric constant along the long axis $\epsilon_1$ than that perpendicular to it $\epsilon_p$ are aligned parallel to the upper layer of alignment material 170 which has been ion beam etched or rubbed to induce such alignment. At the lower layer of material 170, the liquid crystals' long axes are still parallel, but rotated in the layer plane to a different angle. An AC voltage source 240 is applied to transparent electrodes 160 (upper and lower) across the device. A dielectric mirror 190 with reduced reflectance is followed by a light blocking layer with reduced effect ("reduced" means virtually absent for a purely transmitting device). Incident light 140 is randomly polarized, and a first polarizer 150 filters it. Reflected light 148 is filtered by a polarizer 220 of nearly the same orientation as 150. Transmitted light 144 is filtered by polarizer 222 in the transmittance option. The photoconducting layer 210 is positioned between the reduced value light blocking layer and the bottom electrode material 160. Options: For application as a purely reflective nonlinear attenuator, the bottom transparent electrode 160 can be replaced by an opaque or metallic electrode. For the purely nonlinear transmitting attenuator option, however, the bottom electrode must be transparent and reflectance of dielectric mirror 190 may be quite small or the mirror removed entirely; light blocking layer 200 is also thinned or eliminated. This device may operate with incident light from below, striking the photoconductor 210 first, but this layer may slightly alter the polarization and cause some contrast modification.

FIG. 3b illustrates another embodiment of the nonlinear device. It is a similar, layered, active device with a guest-host, nematic liquid crystal dye absorption medium in a light valve arrangement. Here $\epsilon_1$ is dielectric permittivity along the liquid crystal's long axis, $\epsilon_p$ is that perpendicular to the long axis and $\Delta\epsilon \equiv \epsilon_1 - \epsilon_p$, where $\epsilon_p >> \epsilon_t$.) This arrangement is similar to an application mode reviewed by Uchida for a liquid crystal 180 with negative $\Delta\epsilon$ and with dye additives as reviewed by Haas, but uses a photoconductor 210 like that in 3a. In this device, the bounding liquid crystal alignment material 170 is treated with a molecular coating which induces the unperturbed nematic crystals to line up perpendicular to the plane of the layer as shown in 3b. A source 240 applies AC voltage to electrodes. Dots in layer 180 represent viewing the ends of long axes of the liquid crystals which are affected by the photo-enhanced electric field. Incident light 140 is filtered by polarizer 150. Also shown are the photoconductor 210, mirror 190, reflected light 148 and transmitted light 144. Transparent electrode material 160 allows passage of light Options: For the purely reflecting device mirror 190 and the bottom electrode 160 may be fused into an opaque metallic layer. For transmittance operation, the mirror 190 must be transparent or be entirely removed; also the lower electrode must remain transparent.

FIG. 4 illustrates additional embodiments for the real-time, nonlinear, optical attenuator devices. Materials represented are passive, nonlinear attenuators and do not require an electric field. The substance of nonlinear material 270 may include multiple parts, such as interference film layers and active materials. A passive nonlinear attenuator will cause decrease in the ocular's optical throughput due to second harmonic generation or optically induced changes or anisotropies in refractive index, phase structure, or absorption. As discussed in the introduction, this can result in changes in refractive index, birefringence, optical activity, scattering, color changes or broad-band absorption (see patent references). Such perturbances disappear perturb quickly after removal of strong optical excitation. These and other effects are exploited to cause passive attenuation of optical energy in the image of bright objects, and are often termed "optical power limiters." Passive nonlinear attenuation devices incorporating reflection are depicted here, and is one thing which distinguishes this invention from the optical power limiters.

FIG. 4a shows a passive, nonlinear absorbing material 270 sandwiched between transparent substrate material 230. This is essentially one of the real-time, optical power limiters discussed in the introduction, except that a mirror layer 190 is also shown for reflective operation. Incident light 140 enters the device, passes into the nonlinear material 270 and is subsequently reflected 148 or transmitted 144. Options: The mirror 190 may be dielectric or metallic for reflective operation, but for transmissive use, it must be transparent or absent altogether. If the nonlinear material 270 is sufficiently robust, substrate material 230 may be eliminated.

FIG. 4b illustrates a passive nonlinear real-time optical attenuator which requires filters for operation. The material is one of the optical power limiting materials discussed in the introduction. A sandwich structure of substrate material 230, passive nonlinear material 270 and mirror 190 are shown. Incident light 140 passes through filter 15, reflected light passes through filter 35, and transmitted light passes through filter 144. Options: The mirror 190 maybe dielectric or metallic for reflective operation, but it must be transparent or absent altogether for transmissive operation. Filters are either polarizing or spectral band pass filters. Depending on parameters of material 270, one or more filters may not be needed. If the nonlinear material 270 is sufficiently robust, substrate material 230 may be eliminated. Material 270 may be multiple parts, such as interference films, one or more of which is nonlinear.

In 4c, a simple passive, nonlinear optical attenuator based on scattering is shown. Incident optical energy 140 passes through transparent substrate material 230, the nonlinear material 270 and reflects back out from mirror 190 as the upper output light 148. Light transmitted through the mirror passes through the lower substrate of material 230 as the lower output light 144. Scattered light 70 is also illustrated. Since the material recovers quickly after lowering light level, it has real-time operation. Options: If the device is the reflective option, mirror 190 may be dielectric or metallic. If it is the latter, it may be fused with the lower substrate as one layer. For transmissive operation, mirror 190 must be transparent. If the nonlinear material 270 is sufficiently robust or rigid, substrates 230 may be eliminated.

Operation—FIGS. 1 through 6

FIG. 1 illustrates the ocular embodiment which is internally structured for use with a reflective nonlinear attenuator device. The first drawing (1a) illustrates the basic function. Rays in a vertical plane v1 and v2 pass through the central area of lens 10, reflect from mirror 20, are imaged onto the surface of nonlinear device component 30 and subsequently reflect to mirror 40, where they are directed to the eyepiece 50. Rays exit in a near-collimated manner suitable for eye 60. Ray v1 entered on the top and exits at the top. Ray v2 entered at the bottom and exits at the bottom. Scene light passing through the device and being perceived by the eye 60 as imagery is severely reduced for high intensity. This is a function of the nonlinear device 30 operating in concert with the ocular's structural characteristics. Lens 10 images more light rays from the scenery onto device component 30 than can pass through the small aperture of eyepiece 50. This is not optical inefficiency; it is an intentional design to get enough image light onto device component 30 to reduce the scene brightness threshold for nonlinear operation of the ocular system. Another feature of the small aperture for lens 50 is that most light from a nonlinear device component 30 which scatters light at high intensities does not reach the eye and, instead, impacts on the darkened, absorbing inner walls of the ocular enclosure. Filters 15 and 35 are conditional in that their presence and type (polarizing or spectral) depends on the type of nonlinear device component 30. Filter options: None are required for purely scattering nonlinear devices. For a reflecting, nonlinear attenuator device which requires incident light to be polarized and, depending on intensity, rotates the polarization of the specular reflection, filter 15 is a polarizing sheet (or polarizing prism) oriented for the required polarization. The output filter 35 is also a polarizing filter but with an orientation which passes light with polarization characteristic of low intensity light and stops light with polarization associated with high intensity effects. For a nonlinear device which attenuates high intensity light properly polarized by filter 15, filter 35 is absent or of a color which stops the spectral band not attenuated by the nonlinear device component 30 at high optical intensity. For a nonlinear device which attenuates a certain band of light at high intensities, the filter 15 passes the visible light in that band and stops all other. Filter 35 is absent. For a nonlinear device which shifts a visible spectral band pass at high intensity, filter 15 passes that band and filter 35 stops in the visible band where high intensity light causes the band pass to be shifted.

FIG. 1b shows the preferred ocular embodiment which is identical in design and operation with that in 1a except for the addition of cylindrical lenses 80 and 90. This lens pair causes the image produced by the ocular of 1a, which has lateral inversion, to undergo correction. Orientation of the cylindrical lenses is such that another intermediate image plane near mirror 40 is formed, and ray h1 crosses over (in a lateral direction) to the opposite side. Ray h2 undergoes a similar effect. Rays h1 and h2 end up on the same sides of the device (right-left to the eye) as where they were introduced. Cylindrical lens 90 has a focal value and position such that the horizontal plane rays h1 and h2 are slightly diverging and, after passing through lens 50 are nearly collimated.

FIG. 1c also depicts an embodiment basically like 1a, but the lateral inversion is accomplished by an inverting prism 95. Either a dove or Pechan prism will invert light in the vertical plane if they are oriented as shown in FIGS. 1d and 1e. They are illustrated as inverting light in the plane of the paper. To use in the ocular for lateral inversion, a rotation of 90 degrees about a right-left axis in the plane of the page is required. The Pechan prism has a diagonal interface where light striking at the critical angle is reflected, but that at near-normal incidence passes. Five reflections in the prism take place before inversion is complete. The dove prism is simpler, but accommodates a smaller field-of-view.

FIG. 2 illustrates the ocular embodiment with internal optics arranged for transmissive nonlinear devices in the intermediate image plane. The basic concept is represented in FIG. 2a wherein light passing through lens 10 images on the nonlinear device 32. Rays v1 and v2 are in a vertical plane and, at low intensity, pass through device 32 and the output lens 50 to the eye 60. More rays enter lens 10 than can possibly pass to the eye through lens 50. The excess imaging light, however, helps lower the scenery brightness threshold for nonlinear operation. The nonlinear device is understood to include filters, if any. Overly bright scenery light causes the nonlinear device to transmit a smaller fraction of light through lens 50 due to attenuation or scatter. Scattered light from v1 and v2 leaves the device as random rays 70a and 70b, most of which impact the stop barrier 110 around lens 10. The image seen by the eye 60 will have image inversion (rotated 180 degrees).

FIG. 2b shows an embodiment which functions like 2a with the addition of image inversion optics. Image light rays v1 and v2 passing through lens 10 form an inverted image in the plane of nonlinear device 32. The coherent fiber optic bundle 98 in contact with device 32 undergoes a twist and rotates the image by 180 degrees, thus forming an image inverted through the origin at its output. Normal image rays emit in random fashion from each image point on the output surface of bundle 98 and each set undergoes near-collimation at one of a variety of angles by lens 50. Rays passing from lens 50 essentially have the original angular distribution as that falling on lens 10 within the bounds of v1 and v1 and are suitable for observation with the eye. Rays which undergo any wide angle scatter by the nonlinear device 32 will enter and leave the fiber optic bundle 98 with greater angles of divergence and impact on stop 110 or the ocular walls, instead of passing through lens 50 to the eye.

FIG. 2c is also a repeat of 2a, but with the addition of inversion optics different from that depicted in 2b. In this version, the inverter is simply two conventional lenses 85 and 100 with essentially the same focal point. Nearly collimated, but inverted rays leaving lens 50 are refracted by lens 85, pass through the common focal point with lens 100, and are again nearly collimated as they leave lens 100. Through lens 100, the eye 60 sees the image it would see by peering through lens 50, except that the image has correct orientation. FIG. 2d illustrates the preferred form for the ocular with transmissive components 120. It is desirable for the tapered, conical shape of the sides to form a solid angle which coincides with the solid angle defining the ocular field of view for the eye 60. In this way, any loss of vision discontinuity between the ocular-relayed scene image and the scene itself is minimized.

FIGS. 3–4 illustrate real-time, nonlinear optical attenuator options based on modifications of spatial light modulator devices or passive nonlinear devices in which adaptations from their customary use have reduced or eliminated the value of some parameters. In cases where a voltage source is applied, operation will occur with alternating (AC) or direct (DC) current, but best operation will be attained with an AC power source most of the time. To avoid excessive redundancy in explanation, devices shown illustrate both reflection and transmittance operation. In either case, the germane functions take place as light transmits through layers of the nonlinear device; reflectance is mostly a matter of directing the output energy. Parametric changes in elements whose number label is followed by the words "conditional" or "modified" will optimize either reflectance or transmittance. The important layered materials are supported by an upper and lower substrates material 230. The only time the bottom substrate need not be transparent to light is when the device is used as a purely reflective nonlinear attenuator. Each illustration shows light incident on either the photoconducting layer or liquid crystal layer first, but an exchange of these layers, or equivalently changing the direction of incident light and moving the mirror layer (if any) so it is encountered after the last of the aforementioned layers will still allow the intended function, although it may affect contrast and resolution somewhat.

FIG. 3 depicts slight modifications of optically addressed spatial light modulators based on liquid crystal light valve and photoconducting film technology. The illustration in FIG. 3a shows a hybrid field effect, optically addressed, twisted nematic liquid crystal light valve (see Beard, et al) which is modified to function as an active nonlinear optical attenuator. For its use as a reflective device, incident light 140 is polarized by a first polarizer 150, passes through transparent layers and the liquid crystal 180 which twists the initially aligned polarization and reflects it as beam 148 from dielectric mirror 190 which then passes through a second polarizer 220. For low optical intensity, the incident light's polarization twists, and, upon reflection, untwists back to the incident orientation and is passed by polarizer 220 which has similar orientation to 150. A reduced reflectance in mirror 190 and a thinned or eliminated light-blocking, current rectifying layer 200 allows some light to pass through and penetrate the photoconductor layer 210. For high intensity light, this causes part of the applied voltage 240 which exists across the liquid crystal layer 180 to increase since photocurrent in 210 reduces the field in that layer. The increased field disrupts the liquid crystal twist structure in layer 180 and causes the material to become birefringent which, in turn, causes polarization rotation in any reflected light to an angle which is stopped by the second polarizer 220. (For the customary, optically addressed, light valve application, the reflectance in 190 would be high, the light-blocking layer would be strong, and the polarizer 220 oriented differently, causing the device to function in a reverse manner, but with as much linearity as possible. Also read-out light would be reflected from the top and read-in light incident from below; here there is only one light source.) For nonreflected, transmitted light, the second polarizer is located below 222 and is oriented to pass low intensity light but filter out the transmitted output beam 144 when its polarization is oriented by birefringence induced by the higher optical intensity and high field effect in the liquid crystal. Parametric changes which optimize reflective or transmissive operation appeared earlier in the description section.

FIG. 3b shows a similar device with a guest-host, nematic liquid crystal dye absorption medium in a light valve arrangement. In this device, the bounding liquid crystal alignment material 170 is treated with a molecular coating which induces the unperturbed nematic crystals to line up perpendicular to the plane of the layer as shown in 3b. A high electric field, however, will cause a rotation of liquid crystals with large, negative Δs so that the greater dielectric constant is along the field. This is depicted by dots which represent a view down the length of the long axes of the liquid crystals. Because of affixed dye entities, the latter alignment is more absorbing to incident light polarized along the liquid crystal long axis. In operation, incident light 140 is filtered by polarizer 150, passes through the photoconductor 210 and the liquid crystal 180 and, for reflectance applications, exits as 148 after reflection from mirror 190. For transmittance applications, light simply exits as output 144. Where light is not intense, little photocurrent in 210 is stimulated and the external field across the liquid crystal layer 180 remains below the threshold for realignment. Where light is intense, photocurrent in 210 reduces the photoconducting layer field and the voltage 240 across transparent electrode materials 160 falls mostly across the liquid crystal 180, causing liquid crystal realignment, absorption by the dye entities, and less reflectance 148 or transmittance 144. As discussed in the description section, parametric values are optimized for reflection of transmittance operation. The dye is ideally absorbing in the entire spectral band of interest, but if not, a color filter is added to the output to attain fall attenuation.

FIG. 4 depicts versions of the real-time, passive, nonlinear, optical attenuator device. The description above refers to the introduction which references many patents on optical power limiters. This operation differs in that a reflector layer option enables its use with the reflective ocular shown in FIG. 1.

FIG. 4a illustrates a simple, nonlinear absorbing device. Incident light 140 of arbitrary polarization is incident on a material which preferentially absorbs light at the greatest intensities. Light passes through nonlinear material 270, reflects from mirror 190 and exits the top part of the substrate as reflected light 148. That which is transmitted through the mirror 190 exits as 144. Either or both output light rays 148 or 144 relate to the incident light 140 with a lower throughput if the light is high intensity. Parametric optimization yielding a reflective or transmissive device is discussed in the above description section.

In FIG. 4b, filters are included to compliment the type of nonlinear material 270 for which high intensity light causes changes in polarization, spectral bandpass or second harmonic generation. Incident light 140 passes through filter 15 which filters a crucial parameter of the rays so that after undergoing modification by nonlinear material 270, its reflected light 148 or transmitted light 144 is modified by filter 35 or 37, respectively. High intensity light in the nonlinear material 270 causes a greater parametric modification of the output rays 148 or 144 in such a way that filter 35 or 37, respectively, blocks a significant amount of optical energy. Options: Because the parametric modification may be spectral band shift, spectral absorption or polarization change, the filters may be polarizing filters or spectral band pass filters oriented for nonlinear attenuator operation. Other parametric changes which optimize reflective or transmitting operation are considered in the description section above.

FIG. 4c shows a real-time, passive, nonlinear scattering material in a device which functions as a nonlinear attenuator for bright light. Incident light 140 passes through the transparent substrate, and into the nonlinear material 270. For low intensity light reflection at mirror 190 occurs and this results in very little attenuation of rays 148. Transmitted component of the light 144 will likewise be little affected. For sufficiently high intensity, however, the nonlinear material 270 acquires scattering inhomogenieties, resulting in scattered light 70 and diminished outputs 144 and 148. Parametric changes to emphasize the reflective or transmissive operation is presented in the above description section.

SUMMARY, RAMIFICATION AND SCOPE

In summary, the subject invention consists of 1) an ocular uniquely designed to collect more image light than can pass through the system, to form an intermediate image plane, to hold filters, and to correct observed scenery for viewing without image inversion or lateral inversion; and 2) a real-time, nonlinear optical attenuator device component situated in the intermediate image plane and providing selective attenuation of the highest intensity regions. Uniqueness discussed below relates to special modifications and adaptations of the two parts and the fact that they are brought together and attain a novel result: A useful viewing instrument results, especially suitable for eye observation of normal dynamic kinetic) scenery with both uncomfortably bright and low level regions.

Since the nonlinear effect is relevant to both reflection and transmission, both reflecting and transmitting options for obtaining imagery from the nonlinear device are described for the ocular embodiment. The real-time, nonlinear attenuator device, whether reflective or transmissive in operation, is either an active or passive device. Passive nonlinear attenuator devices do not require electrical power and are often termed optical power limiters (OPLs). Some will require filters. Transmissive optical power limiters have already been patented, but the subject invention adds a mirror to enable a reflective mode of operation and furthermore provides a concept for a uniquely suitable ocular in which to place it. Usually, power level or else integration time is very high for OPLs, but their use in special applications such as viewing scenery with lasers or scenery which changes very slowly provides application possibilities. The active nonlinear attenuator devices are much more sensitive, and require electric power. Embodiments of these devices are described in which potential or existing optically addressed spatial light modulators (OASLs) are modified and adapted to the new purpose of providing a real-time, active, nonlinear attenuator device. The OASLMs considered are based on well-founded liquid crystal light valve and photoconducting technologies.

Uniqueness of the ocular in the subject invention begins with the fact that 1) the input lens is designed to collect more light rays than can actually pass through the output lens; this is to increase the intensity in the intermediate image plane to the point where the nonlinear attenuating device will operate. 2) Another special feature is that the same ocular design functions with either a scattering or reflective/transmissive nonlinear attenuator device. 3) The reflective ocular embodiment (FIG. 1) is uniquely designed for the glare reduction application and would probably resembles no other optic device. 4) A special feature of the transmissive ocular embodiment (FIG. 2) is that the shape allows observation through the device with minimum obscuration of the surrounding field.

The nonlinear attenuator device placed in the ocular of the subject invention is unique because 1) it modifies other applied art for real-time dynamic range compression of intensity levels encountered in scenery normally observed by the eye. In general, it is continually functional for levels beneath that of intense laser light and makes scenery comfortable and continually observable, rather than serve primarily as a protection against sudden intense flashes. 2) The new feature for the passive, nonlinear attenuator device embodiment is in the addition of a mirror layer so that it can operate in the reflective mode and accommodate passage of the light through the active material twice, enhancing its effect on attenuation. 3) The uniqueness of the active, nonlinear device embodiment is that it is an adaptation from spatial light modulator art to a new application: It becomes a highly sensitive, real-time, nonlinear attenuation device for dynamic (kinetic) scenery observed by the eye or an instrument which substitutes for the eye.

Ramifications within the context of the subject invention's purpose are significant. However, some are so specific that, to avoid misunderstanding and discontinuity and to place them where germane subject was developed, they were covered in the description as options. Here more general ramifications will be introduced: Although designed for use by the human eye, any device which substitutes for the eye is also aided by the subject invention. In fact, some of the simpler embodiments (FIG. 1a and FIG. 2a) are useful where a camera recording can later be subjected to inversion or reverse-symmetry correction. Although the purpose of the invention is mostly concerned with making imagery (not necessarily of dangerous brightness levels) less spatially variant in optical radiance and more comfortable to view, in some instances it will be useful to protect the eyes or an instrument which substitutes for the eyes. This invention may also be used in a binocular (two-ocular) embodiment. Duplication in a binocular arrangement is an obvious extension of the subject invention. It may be installed in automobiles, aircraft, military tanks, etc. as permanent attachments. Corrections of aberrations in optical components would not change the concept of the subject invention.

The scope of this invention consists of an ocular with an intermediate image plane and a real-time, nonlinear device to reduce especially bright regions of imagery within parameters suitable for use by the eye or instrument substituting for the eye. The subject invention teaches the general idea on how existing and potential art can be adapted to this invention. Numerous modifications and substitutions not explicitly covered can be inferred from this teaching. These and many other modifications fall within the spirit and scope of the subject invention. The technology and specific embodiments taught herein do not limit the concept and spirit of the subject invention, and its scope should be inferred from the claims.

Definition of Terms

To facilitate descriptions, a short table of definitions is provided.

| | | |
|---|---|---|
| real-time: response to presence and removal of optical signal being faster or comparable to human eye response time. | enabling environment: features of ocular which promote optimum positioning of the nonlinear device, supply it with electric power, if required, and hold any filters it may require to convert the device's alteration of light to attenuation. | light rays: a geometrical trace of light rays which go through the ocular; a ray may suffer attenuation, but is not stopped unless it terminates without passing through the eyepiece. |
| inversion: an image coordinate reversal from the original scenery; inversion through an axis is mirror-like; inversion through the origin point is equal to 180 degree rotation | passive: reference to nonlinear optical material in which function is dependent only on light intensity. | filter orientation: a rotation angle generally in the plane perpendicular to the direction of light; orientation of a polarizing filter determines attenuation of polarized light passing through. |
| filter: a device which selectively passes light with a preferred polarization angle or a preferred spectral wavelength band | active: reference to nonlinear device in which nonlinear optical function depends on the presence of an electric field. | mirror: metallic or dielectric specular reflector of light; may be somewhat transparent or totally reflecting. |
| attenuator: device which reduces reflectance or transmittance (both express ratio of output to incident light intensity). | selective glare reduction: spatial brightness configuration of image is attenuated more in regions of greater brightness. | light altering material: layered nonlinear material(s) that alter polarization, spectral wavelength, transmittance, reflection/refraction or scattering of light as part of an attenuation mechanism. |

I claim:

1. A transmissive scene viewing apparatus containing an objective lens means which gathers light rays from scenery, forms an intermediate image and provides an eyepiece means for viewing by the eye or a camera which substitutes for the eye, all said components on the same optical axis; furthermore said apparatus having:

an internal holder means for the containment of a uniform, non-segmented, optically nonlinear, transmissive attenuator device of at least one layer essentially in said intermediate image region and for containment of any required filters needed for the full realization of said transmissive attenuator device, said objective lens means sized and positioned so as to direct more light rays onto said transmittance attenuator device than are intercepted by the eyepiece, whereby sensitivity of operation is increased for said attenuator device to bright image regions without sacrificing viewed image sharpness; one example of said means having a larger objective lens than eyepiece with distance between said attenuator device and objective lens being similar to that between said attenuator device and eyepiece, an eyepiece means suitable for collimating light when scenery is distant, said eyepiece bordered by a nonreflective stop material for absorbing scattered light, a housing generally of conical shape tapering down on the eyepiece end for each viewing eye or camera which substitutes for the eye, deviating only for a) any necessary connecting surfaces and b) any necessary melding of adjoining surfaces for binocular applications; whereby said housing obscures minimum object scenery around each said apparatus field-of-view.

2. The viewing apparatus of claim 1 with an optical image inverter positioned between said intermediate image plane region and the last element of said eyepiece means.

3. A reflective scene viewing apparatus containing an objective lens means which gathers light rays from scenery, forms an intermediate image and provides an eyepiece means for viewing by the eye or a camera which substitutes for the eye, furthermore said apparatus having:
- an internal holder means for the containment of a uniform, non-segmented, optically nonlinear, reflective, attenuator device of at least one layer essentially in said intermediate image region and for containment of any required filters needed for the full realization of said reflective attenuator device,
- mirror means which directs light from the objective lens to the reflective attenuator device, and from the reflective attenuator device toward said eyepiece
- said objective lens means sized and positioned so as to direct more light rays onto said reflective attenuator device than are intercepted by the eyepiece, whereby sensitivity of operation is increased for said attenuator device to bright image regions without sacrificing viewed image sharpness; one example of said means having a larger objective lens than eyepiece with distance between said attenuator device and objective lens being similar to that between said attenuator device and eyepiece.

4. The viewing apparatus of claim 23 in which an optical image reversal means is positioned between said intermediate image plane region and the last element of said eyepiece means, said means reversing the placement of right and left points in the viewed virtual image from those in said intermediate image plane.

5. An improved passive, optical, nonlinear, attenuator device enabling use as a selective reducer of brightest light in a glare reduction ocular, said device comprised of a passive, optical, nonlinear material of at least one layer to which improvement is attained by the attachment of a mirror layer means on the side of said material opposite said incident light, whereby double passage of light rays through said nonlinear material is caused, and, in combination with other factors such as optics which concentrate more rays on said device than are captured by reflection into the eyepiece, increases performance substantially; furthermore said device having uniform, non-segmented extent to each layer and having unaided recovery to removal of bright light in a time period which makes it useful as a filter for viewing changing scenery.

6. The attenuator device of claim 5 for which functional examples of said optical, nonlinear material include the following classes:
- those which alter intense light via broad band spectral absorption,
- those which alter intense light via change of refractive index, whereby, in concert with interference filters, spectral absorption is attained,
- those which alter intense light via change of polarization angle, whereby, in concert with polarizing filters of proper orientation, attenuation is attained,
- those which alter intense light via second harmonic generation, whereby, in concert with a filter which passes the fundamental wavelengths, attenuation is attained,
- those which alter intense light via scattering of light rays over large angles.

7. An active, nonlinear attenuator device comprising optical, materials which, formed in layers and placed in an enabling environment, constitute a means which is little affected by usual levels of light in a superimposed image, but is affected by regions of most intense light in such manner that said intense light subsequently directed from said device is altered to promote significant attenuation; use of said device reducing contrast of scenery with brightness comparable to that viewed by the human eye indoors and in daylight; the maximum optical response time of said device means being comparable to the human eye response time; furthermore said device:
- has a uniform, non-segmented extent to each layer,
- has response to and alteration of light that is intrinsic, whereby need for external or surrounding circuitry, other than electrical power, is eliminated,
- returns to its state prior to bright light exposure when said light is removed, having no need for an external erasure or state-changing means,
- has transparent electrodes attached to transparent substrates, with other materials sandwiched in between,
- incorporates a photoconducting layer which is not shielded by any layer that completely blocks light from it,
- has said electrode layers exposed to a voltage source, whereby in conjunction with said photoconducting layer, light stimulated charge motion can alter the electric field in the said device,
- incorporates a liquid crystal layer means which responds to a strong electric field essentially with nonscattering, crystalline reorientation,
- operates with a filter means which polarizes incident light and an absorption means whereby light of one polarization is passed and that of an orthogonal direction is strongly attenuated.

8. The attenuator device of claim 7 in which the photoconducting layer is transparent and in which said liquid crystal layer means incorporates said absorption means, that being a dye agent coating the liquid crystals and promoting selective absorption of light that is polarized along the crystal axis direction, said direction being determined by reorientation of said crystals in regions of high electric field, whereby operation of said device in a transmittance attenuator mode is made possible.

9. The attenuator device of claim 7 in which said liquid crystal layer means incorporates said absorption means, that being a dye agent coating the liquid crystals and promoting absorption of light that is polarized along the crystal axis direction, said direction being determined by reorientation of said crystals in regions of high electric field, and said attenuator device in which a reflective dielectric layer means is placed on the side of the said liquid crystal layer which is opposite the incident light, whereby operation of said device in a reflectance attenuator mode is made possible.

10. The attenuator device of claim 7 in which the photoconducting layer is transparent, in which the liquid crystal layer means constitutes a twisted nematic structure which responds to high electric field by changing the angle of polarized light, and in which a second polarizer which filters the light directed away from said device constitutes said absorbing means and is oriented such that light of a polarization angle characteristic of high brightness, high field regions is attenuated to the greater extent.

11. The attenuator device of claim 7 in which the liquid crystal layer means constitutes a twisted nematic structure which responds to high electric field by changing the angle of polarized light, and in which a second polarization means which filters the light directed away from said device constitutes said absorption means and is oriented such that light of a polarization angle determined by high brightness, high field regions of said device is attenuated to the greater extent, and said device in which a partly transparent, reflective dielectric layer is positioned between the liquid crystal layer means and the electrode layer means opposite incident light, whereby the said device becomes a reflective, nonlinear, attenuator device in which the photoconductive layer is not completely shielded from incident light.

12. The attenuator device of claim 11 in which a single polarizing filter constitutes both polarizer of incident light and said second polarization means, whereby said single filter placed in the intermediate imaging region operates on incident and reflected light the same way and affords design efficiency.

* * * * *

UNITED STATES PATENT AND TRADEMARK OFFICE
CERTIFICATE OF CORRECTION

PATENT NO. : 5,797,050
DATED     :    Aug 18, 1998
INVENTOR(S) : James Lynn Smith It is certified that error appears in the above-identified patent and that said Letters Patent is hereby corrected as shown below:

On the title page: Item [76]

Change the address of the patentee
to "823 Overbrook Dr., Ft. Walton Beach, FL 32547.

Column 4, line 5:  Change word "ration" to "operation".

Column 8, line 11: Section heading erroneous in many respects; Change "Operation - FIGS. 1 through 6" to "OPERATION-FIGS. 1 through 4"

*Column 8 line 11: Section heading should be delineated above and bleow by a line-spacing, so the section can be redily found.

UNITED STATES PATENT AND TRADEMARK OFFICE
CERTIFICATE OF CORRECTION

PATENT NO. : 5,797,050
DATED : August 18, 1998
INVENTOR(S) : James Lynn Smith

It is certified that error appears in the above-identified patent and that said Letters Patent is hereby corrected as shown below:

Column 11, line 4: Change "$\Delta s$" to "$\Delta \varepsilon$" (delta epsilon).

Column 12, approx. line 42: "OASLs" should be "OASLMs".

Column 14, table: Missing line-space delineations causes definitions to run together and become difficult to find: Reading from left-to-right, insert line-space delineations across-the-table just above word groups "inversion: - passive: - filter orientation:" and "filter: - active: - mirror:" and finally "attenuator: - selective glare reduction: - light altering material:"

Signed and Sealed this

Eighth Day of December, 1998

*Attest:*

BRUCE LEHMAN

*Attesting Officer*      *Commissioner of Patents and Trademarks*